United States Patent
Narayana et al.

(10) Patent No.: US 9,587,628 B2
(45) Date of Patent: Mar. 7, 2017

(54) METHOD FOR OPERATING A WIND TURBINE

(75) Inventors: Kasibhatla Satish Narayana, Anantapur (IN); Arne Koerber, Berlin (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1003 days.

(21) Appl. No.: 13/351,690

(22) Filed: Jan. 17, 2012

(65) Prior Publication Data
US 2013/0181450 A1    Jul. 18, 2013

(51) Int. Cl.
*F03D 7/02* (2006.01)
*F03D 7/04* (2006.01)

(52) U.S. Cl.
CPC ............ *F03D 7/0276* (2013.01); *F03D 7/02* (2013.01); *F03D 7/0224* (2013.01); *F03D 7/04* (2013.01); *F05B 2270/101* (2013.01); *F05B 2270/1011* (2013.01); *F05B 2270/1016* (2013.01); *F05B 2270/32* (2013.01); *F05B 2270/3201* (2013.01); *F05B 2270/321* (2013.01); *F05B 2270/327* (2013.01); *F05B 2270/328* (2013.01); *F05B 2270/335* (2013.01); *Y02E 10/723* (2013.01)

(58) Field of Classification Search
CPC . F03D 7/02; F03D 7/04; F03D 7/0224; F03D 7/024; F03D 7/0276; F03D 7/028; F03D 7/0292; F03D 7/042; F03D 7/046; F05B 2270/321; F05B 2270/101; F05B 2270/328; F05B 2270/32; F05B 2270/1011; F05B 2270/1016; F05B 2270/30; F05B 2270/3201; F05B 2270/322; F05B 2270/327; F05B 2270/331; F05B 2270/332; Y02E 10/723; Y02P 70/523

USPC ........................................................ 290/44
See application file for complete search history.

(56) References Cited

U.S. PATENT DOCUMENTS

| 7,573,149 B2 * | 8/2009 | Kammer ............... F03D 7/0224 290/44 |
| 7,629,702 B2 * | 12/2009 | Schubert ......................... 290/44 |
| 8,067,845 B2 * | 11/2011 | Thulke et al. ................... 290/44 |

(Continued)

FOREIGN PATENT DOCUMENTS

WO        2011157271 A2    12/2011
WO   WO 2011157271 A2 *  12/2011

OTHER PUBLICATIONS

Slootweg, J.G. et al., "General model for representing variable speed wind turbines in power system dynamics simulations," Power Systems, IEEE Transactions on, vol. 18, No. 1, pp. 144-151, Feb. 2003.*

(Continued)

*Primary Examiner* — Crystal J Barnes-Bullock
(74) *Attorney, Agent, or Firm* — GE Global Patent Operation; Douglas D. Zhang (57) ABSTRACT

A method for operating a wind turbine is provided. The wind turbine includes a rotor adapted to rotate at an optimal speed. The method includes determining a turbulence parameter; and operating the wind turbine at a speed that is increased by a speed deviation amount as compared to the optimal speed. The speed deviation amount is dependent on the turbulence parameter. A wind turbine (100) having a controller (202) for controlling the wind turbine according to the disclosed method is also provided.

18 Claims, 5 Drawing Sheets (56) References Cited

U.S. PATENT DOCUMENTS

| | | | |
|---|---|---|---|
| 8,093,737 B2* | 1/2012 | Wittekind | F03D 7/0276 290/44 |
| 8,380,357 B2* | 2/2013 | Garcia Barace | F03D 7/0224 290/44 |
| 9,062,656 B2* | 6/2015 | Brath | F03D 7/0224 |
| 2009/0060740 A1* | 3/2009 | Stiesdal et al. | 416/41 |
| 2009/0146424 A1 | 6/2009 | Kammer et al. | |
| 2009/0241659 A1* | 10/2009 | Yoshida et al. | 73/170.07 |
| 2009/0295160 A1 | 12/2009 | Wittekind et al. | |
| 2010/0241280 A1* | 9/2010 | Garcia Barace et al. | 700/287 |

OTHER PUBLICATIONS

Kitchener, WIPO Patent Application Publication No. WO2009153614 A2.*

Rozenn et al., "Simulation of shear and turbulence impact on wind turbine performance". Jan. 2010. Riso-R-Report. Risø National Laboratory for Sustainable Energy Technical University of Denmark. website: http://orbit.dtu.dk/fedora/objects/orbit:82065/datastreams/file_4550246/content.*

Danish Office Action issued in connection with corresponding DK Application No. PA201370020 on Aug. 29, 2014.

* cited by examiner

METHOD FOR OPERATING A WIND TURBINE

BACKGROUND OF THE INVENTION

The subject matter described herein relates generally to methods and systems for operating a wind turbine, and more particularly, to methods and systems for operating a wind turbine below rated power. The subject matter furthermore relates to a controller for operating a wind turbine and a wind turbine.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits.

A wind turbine can only extract a certain percentage of the power associated with the wind, up to the so-called maximum "Betz limit" of 59%. This fraction is described as the power coefficient. The value of the power coefficient is a function of the form, wind speed, rotation speed and pitch of the specific wind turbine. Assuming all other operational variables to be constant, this coefficient has only one maximum point at a fixed wind speed as the rotational speed is varied. It is therefore known to adjust the rotation speed of the turbine's rotor to this maximum value, that is called "optimal rotation speed" herein, in order to extract the maximum power possible out of the wind.

The characteristics of the power coefficient are normally expressed in terms of the tip-speed-ratio $\lambda$, which is defined as:

$$\lambda = \frac{v_p}{v} = \frac{\Omega \cdot R}{v}$$

wherein $v_p$ is the tip-speed of the one or more turbine blades, R is the turbine rotor radius, $\Omega$ is the rotational turbine angular velocity and $v$ is the wind speed.

Figure 3:
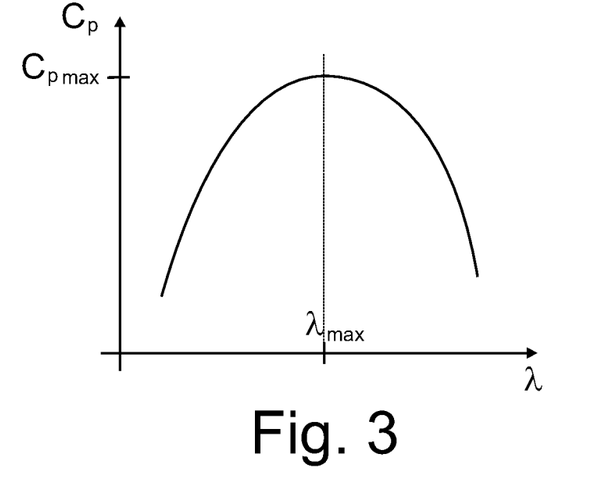
FIG. 3 is a schematic illustration of the power coefficient in dependence of the tip-speed-ratio.

In FIG. 3, the power coefficient $C_P$ is plotted as a function of the tip-speed ratio $\lambda$ for an exemplary wind turbine. As it is evident from the diagram, the power coefficient is a function of the tip-speed ratio, and it has only one maximum value. Therefore, known wind turbines are operated at a rotation speed that corresponds to the tip-speed ratio which is called $\lambda_{max}$ in FIG. 3. Thereby it is possible to extract as much energy from the wind as theoretically possible.

In modern wind turbines, small improvements in energy yield may result in an essential increase of the return in investment of the turbines. It is thus an ongoing desire to further increase the annual energy production (AEP) of a wind turbine. The inventors of the present disclosure have found out a method to do so which is particularly applicable when the turbine is operated below rated power.

BRIEF DESCRIPTION OF THE INVENTION

In one aspect, a method for operating a wind turbine is provided. The wind turbine includes a rotor adapted to rotate at an optimal speed. The method includes determining a turbulence parameter; and operating the wind turbine at a speed that is increased by a speed deviation amount as compared to the optimal speed. The speed deviation amount is dependent on the turbulence parameter.

In another aspect, a method for operating a wind turbine is provided. The wind turbine includes a rotatable rotor adapted to rotate with an optimal speed. The method includes measuring the turbulence intensity; setting the speed of the rotor to a speed that corresponds to the sum of the optimal speed and a speed deviation amount; and operating the wind turbine at said set speed. The speed deviation amount is dependent on the turbulence intensity.

In yet another aspect, a wind turbine is provided. The wind turbine includes a rotor including at least one rotor blade. The rotor is adapted for rotating at an optimal speed. The wind turbine further includes a controller for controlling the wind turbine. The controller is configured for carrying out the methods described herein partly or completely. In particular, the controller may be configured for determining a turbulence parameter; and operating the wind turbine at a speed that is increased as compared to the optimal speed of the rotor by a speed deviation amount. The speed deviation amount is dependent on the turbulence parameter.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that is operated with an increased efficiency in terms of annual energy production (AEP). More specifically, the wind turbine may particularly be operated according to the present disclosure in locations and/or environments with a high level of turbulences. Also, the positive effects of the operation method as described particularly apply to the energy yield during operation below rated power of the wind turbine.

As used herein, the term "power" is intended to be representative of the energy produced by the wind turbine per time. Typically, the power is measured in the physical unit of Watt [W]. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy and typically further to electrical energy.

The term "turbulence parameter" as used herein shall include any parameter that represents the turbulence intensity of the wind at the wind turbine's site. In particular, the turbulence parameter might be based or influenced by the turbulences of the wind speed and/or the wind direction. It typically refers to the short-term variations and it may particularly refer to the short-term variations of the wind speed and/or the short-term variations of the wind direction. The term "short-term" in this context is to be understood as in the range of up to one minute or even only up to half a minute.

The term "operating a wind turbine optimally" or "operating a wind turbine with the optimal rotation speed" shall refer to an operation of the wind turbine at a rotation speed of the rotor that allows to yield theoretically the maximum possible power gain, that is, to a rotation speed where the tip-speed-ratio $\lambda$ has its maximum power coefficient in theory, as exemplarily explained with regard to FIG. 3 previously. Similarly, the terms "optimal speed", "optimal tip speed", "optimal rotation speed" or "optimal tip-speed-ratio" at a given wind shall refer to a speed of the rotor such that the power coefficient is at its maximum in theory, as illustrated with respect to the diagram of FIG. 3.

The present embodiments might include determining the optimal speed, such as, determining the optimal rotation speed or the optimal tip-speed-ratio. The phrase "determining the optimal speed" shall particularly include calculating the optimal speed and/or retrieving the optimal speed from a memory, such as from a data base or the like. The optimal speed could also be retrieved from a remote system, such as a remote wind turbine control center. According to embodiments, the optimal speed is not explicitly calculated but the wind turbine is operated with the optimal speed. This will be explained in more detail below. The term "speed deviation amount", or synonymously "speed deviation amount of the rotation speed" as used herein is intended to be representative of the additional rotation speed as compared to the optimal speed. The speed deviation amount may be represented in a percentage unit or in a speed unit, such as, but not limited to, m/s, km/h, mph, 1/s, Hz, and the like. Although the following description, for convenience, describes the speed deviation amount mostly with reference to the rotation speed, it shall be understood that further ways of expressing the rotor speed, such as the tip speed or the tip-speed-ratio, can equivalently be used. The speed deviation amount may be determined, for instance, by the controller that may be adapted to calculate it. According to other embodiments, the speed deviation amount is not explicitly calculated but the settings of the wind turbine, in particular of the generator, are adjusted such that the wind turbine is operated with the optimal speed plus the speed deviation amount.

Experience shows that the wind is almost never constant in practice. That is, the wind speed typically varies on a short-term scale, and/or the wind direction typically varies on a short-term scale. Generally, despite thereof, the operation of the wind turbine seeks to follow the variations and to operate the wind turbine optimally. For instance, if the wind turbine operates optimally at the given wind, and a gust hits the wind turbine, the turbine might adjust its settings, such as the pitch setting or the generator torque setting. Thereby, known wind turbines adjust the settings in such a manner that the tip-speed-ratio is again at its maximum power coefficient under the wind conditions caused by the gust. Quite the same applies when the wind suddenly decreases, such as in the case of a lull. Thereby, at least in theory, the optimum energy yield can be achieved. However, in practice, it takes some time until the settings are adjusted and the adjusted settings become effective. Therefore, in practice a turbine is often operated with a tracking error. The tracking error corresponds to the fact that the runs after the current environmental situation.

According to the present disclosure, however, the wind turbine is run at a higher tip speed than the optimal tip speed. In this regard, it shall be highlighted that, given a wind turbine, the tip speed is directly and unambiguously correlated to the rotation speed. Let l be the length of the one or more rotor blades of the wind turbine, then the tip speed is defined as $2\pi l$ times the rotation speed. Furthermore, at a given wind, the tip-speed-ratio is directly and unambiguously correlated to both the rotation speed and the tip speed. Hence, the term "tip speed", "optimal tip speed", and "rotation speed", "optimal rotation speed" might be used synonymously herein. In particular, the phrase "the wind turbine is operated at a specific tip-speed-ratio" can be synonymously be used to "the wind turbine is operated at a specific rotation speed" or "the wind turbine is operated at a specific tip speed", since the specific tip-speed-ratio, the specific rotation speed, and the specific tip speed are unambiguously corresponding to each other.

Despite the selection of a rotation speed that is theoretically non-optimal, surprisingly, the inventors found out that it is thereby possible to increase the overall AEP. Thereby, according to the present disclosure, the turbulence intensity at the wind turbine site is taken into account in order to determine the speed deviation amount of the rotation speed. The inventors of the present disclosure found out that it is more profitable to react to gusts rather than lulls. In other words, by running the wind turbine at higher than the optimal tip/rotation speed, the wind turbine is capable of regaining the optimal tip/rotation speed quickly if there is a gust. This is because, at a given aerodynamic torque of the rotor blades and at a given wind speed, the higher the optimal tip-speed-ratio, the faster the wind turbine rotates. Hence, when the wind speed increases, the turbine needs to increase the rotation speed in order to operate the turbine at the optimal operating point.

This being found out by the inventors, on the other hand, operating the wind turbine at a higher speed than the optimal speed means that the turbine needs longer to reduce the rotor speed if the wind decreases, such as in the event of a lull. Consequently, if there is a lull, the power output of the herein disclosed operating method can be expected to be worse than the operating method as known in the art, that is, at the optimal rotation speed instead of an increased rotation speed.

Nevertheless, experimental results of the inventors show that the overall energy yield of a wind turbine operated according to the disclosed methods is increased in comparison to the known operating methods. The reason is that the power that can be maximally generated by the wind turbine is proportional to the cube of the wind speed. Hence, an improvement in the power yield at higher wind speeds outweighs a worsening in the power yield at smaller wind speeds.

Hence, in turbulent conditions including, a series of gusts and lulls the combined gusts gains will outweigh both the losses from lulls and the losses from constant wind speed times when the turbine would operate at its optimum if it was controlled optimally as known in the art. Therefore, according to embodiments that can be combined with all other embodiments described herein, the method for operating a wind turbine as described herein is applied only when the gusts and lull dominate the wind, that is, if a minimum threshold value of turbulence is exceeded.

As the turbulence intensity increases, operating the turbine at higher rotation speed as compared to the optimal rotation speed results typically in more positive effect than at lower turbulence intensities. Hence, according to some embodiments, the speed deviation amount from the optimal speed is increased when the turbulence intensity increases. Additionally or alternatively, according to some embodiments, the speed deviation amount from the optimal rotation speed is decreased when the turbulence intensity decreases.

Typically, the wind turbine includes a closed loop rotation speed controller that is adapted to take into account the turbulence intensity, for instance, represented by a turbulence parameter. For instance, if there is a high turbulence (corresponding to a first turbulence parameter), the controller operates the wind turbine in such a way that the rotation speed is increased as compared to the optimal rotation speed at a larger speed deviation amount than during lower turbulence (corresponding to a second turbulence parameter that is smaller than the first turbulence parameter).

According to some embodiments described herein, the method for operating a wind turbine includes calculating the optimum speed, and/or calculating the speed deviation amount. Correspondingly, the controller as described herein may be adapted for calculating the optimum speed, and/or calculating the speed deviation amount. Accordingly, any information about the wind speed should be as exact as possible. Having these values, the turbine settings can be adjusted as described, in particular, the speed can be adjusted to the speed plus the speed deviation amount.

The controller might provide the optimal rotation speed. According to embodiments, the controller determines the value of the optimal rotation speed. For instance, the controller might retrieve values from a look-up table, a data storage, or the like (see description of FIG. 2 for examples). Alternatively, the controller, and/or another suitable processing unit operatively connected to the controller, might calculate the optimal rotation speed. An operation of the wind turbine that includes calculating or determining the optimal speed and/or the speed deviation amount shall be called "explicit operation method".

However, according to many embodiments of wind turbines and methods for operating wind turbines, the exact current wind speed is unknown to the wind turbine controller as it cannot be measured accurately enough on the turbine. Having low quality information about the wind speed, instead of explicitly calculating the optimal speed, the present embodiments may make use of the following implicit control law. If the optimum tip speed ratio and corresponding power coefficient for the turbine are known, such as stored in a data storage at the controller or the wind turbine, then a value k can be computed such that the control law $M_g = k * \omega^2$ is fulfilled where $M_g$ is the controllable generator torque and $\omega$ the rotational speed of the rotor. Please note that k is also called "tip-speed-ratio factor" and is dependent on a number of values, including the air density, the optimal tip-speed-ratio $\lambda_{max}$ and the corresponding optimal power coefficient $C_{pmax}$ (see FIG. 3). This implicit control law will then lead to the operation of the wind turbine with the optimal speed without the need to actually know the current wind speed and tip speed ratio. Hence, in summation, with the implicit operation method, the wind turbine is operated at the desired speed without an explicit calculation of the optimal rotation speed and/or the deviation amount of the speed.

Known wind turbines are operated according to the optimal rotation speed. The current disclosure proposes that the controller operates the wind turbine at an increased rotor speed as compared to the optimal rotation speed. The speed deviation amount, i.e., the quantity by which the rotation speed is increased as compared to the optimal rotation speed, is typically dependent on the measured or estimated turbulence intensity which may be reflected by a turbulence parameter. A predetermined transfer function or relation for determining the speed deviation amount in dependence of the turbulence intensity can be used in order to enable the controller to dynamically change the rotor speed according to the present disclosure.

According to embodiments, the operation of the wind turbine as described herein may include a speed deviation amount or a tip-speed-ratio deviation amount of at least 5% or even at least 10%. For instance, at low turbulences, the wind turbine is operated at a rotation speed (or a tip-speed-ratio) that includes a small speed deviation amount from the optimal rotation speed (or a tip-speed-ratio deviation amount), for instance, at a deviation amount of maximally 8% or even maximally 5%, and typically at least 1% or 2% of the optimal rotation speed (or the optimal tip-speed-ratio). As understood herein, a speed deviation amount or a tip-speed-ratio deviation amount from the optimal rotation speed or the optimal tip-speed-ratio shall be understood as an intended deviation as disclosed herein. A deviation from the optimal rotation speed or the optimal tip-speed-ratio shall not be misunderstood as a deviation due to changing wind conditions wherein, however, the controller of the wind turbine is configured to avoid any such deviation. At higher turbulences, the wind turbine is operated at a high deviation from the optimal rotation speed or the tip-speed-ratio, for instance, at a deviation amount of at least 5%, 10%, or even 15% from the optimal rotation speed or the optimal tip-speed-ratio.

For instance, the optimal rotation speed at a given time for a given wind turbine may be such that the tip-speed-ratio is at λ=8.0. A known wind turbine would be operated in such a way that the controller seeks to adjust all parameters, in particular the generator moment, such that the tip-speed-ratio is in fact at λ=8.0. However, according to the present disclosure, since a high turbulence is determined, such as measured or estimated, the controller seeks at operating the wind turbine at a higher rotation speed, for instance, at a rotation speed that correspond to a tip-speed-ratio of λ=8.8 or even λ=9.0.

The turbulence intensity is typically represented by the turbulence parameter. The turbulence parameter may be a scalar value, a vectorial value, or a matrix value. The turbulence parameter may be one or more of an average wind speed, a span width of the wind speed, a standard deviation of the wind speed, an average wind direction, a span width of the wind direction, a standard deviation of the wind direction. The standard deviation of the wind speed and/or the standard variation of the wind direction may be normalized by dividing the calculated standard variation by the respective average value, that is, the wind speed average and/or the wind direction average. Herein, and in harmony with the literature, the standard deviation shall be represented by a. It may particularly refer to the normalized standard deviation of the wind speed, the normalized standard deviation of the wind direction, and/or a combination thereof. Typical normalized standard deviations of the wind speed are in the range of up to about 30% at wind turbine sites with a high level of turbulences, and of up to about 15% at wind turbine sites with a low level of turbulences.

Generally, and not limited to any embodiment, determining the turbulence parameter includes at least one of calculating an average value and a standard deviation. It is typical that the measured values are measured in a time interval of at least 5 minutes. Determining the turbulence parameter might include measuring variations in the pitch angle of the at least one rotor blade and/or measuring variations of the power output of the wind turbine.

The relation (such as a numerical function) between the speed deviation amount from the optimal rotation speed and the turbulence parameter can be stored at the wind turbine so that the controller can recall it at all times necessary. The relation is typically steadily increasing, that is, the higher the turbulence parameter, the higher the speed deviation amount. That is, generally, and not limited to any embodiment described herein, at the same wind speed, the control of the wind turbine depends on the turbulence intensity. In particular, it is possible that the turbulence intensity is below a selectable threshold value such that the turbulence mode as described herein, i.e. the operation of the wind turbine at an increased speed, is switched off completely.

For instance, let the turbulence parameter be the normalized standard deviation of the wind speed σ, then the speed deviation amount d could be calculated, for instance, as σ times f, whereas f shall represent a multiplication factor that may be selected between 0.1 and 3, more typically between 0.5 and 2. The multiplication factor is typically selectable and may depend on the location, in particular, on the frequency of gusts and lulls. For example, let the turbulence parameter be σ=10%, and at the given wind, let the optimal tip-speed-ratio be $\lambda_{opt}$=7.8. In the example, let the multiplication factor f be selected to be 1.5, then the deviation calculates as d=10%*1.5=15%. Consequently, the turbine is operated with a speed deviation amount of $\lambda_{opt}$*d=7.8*0.15=1.17 off the optimal tip-speed-ratio of 7.8, that is, the turbine is operated with a tip-speed-ratio of $\lambda=\lambda_{opt}$+1.17=8.97.

According to embodiments, the variation of environmental conditions like temperature, atmospheric density are considered when determining the operating rotation speed. The torque that is produced at a given wind speed is typically a function of atmospheric density and thus temperature. In the implicit control law described above this means that the tip-speed-ratio factor k needs to be adjusted depending on the density and/or temperature. Also in the explicit formulation the environmental conditions may be considered when obtaining the current wind speed.

The control of the method as disclosed herein is typically dynamic. That is, typically the control is based on actual values of site parameters, such as, but not limited to, temperature, density, wind direction, and/or wind speed. The site parameters may be directly measured or indirectly determined, for instance, by measuring another parameter that allows conclusion thereon.

According to embodiments, the operation is controlled by varying the generator moment in order to amend the rotation speed of the rotor. Furthermore, according to embodiments, the present method is applied only at wind speeds below the rated wind speed (i.e., at the wind speed that corresponds to the rated power of the wind turbine). Furthermore, according to embodiments, the method of operation herein keeps the pitch angle constant as long as the wind speed is below the rated wind speed.

Figure 1:
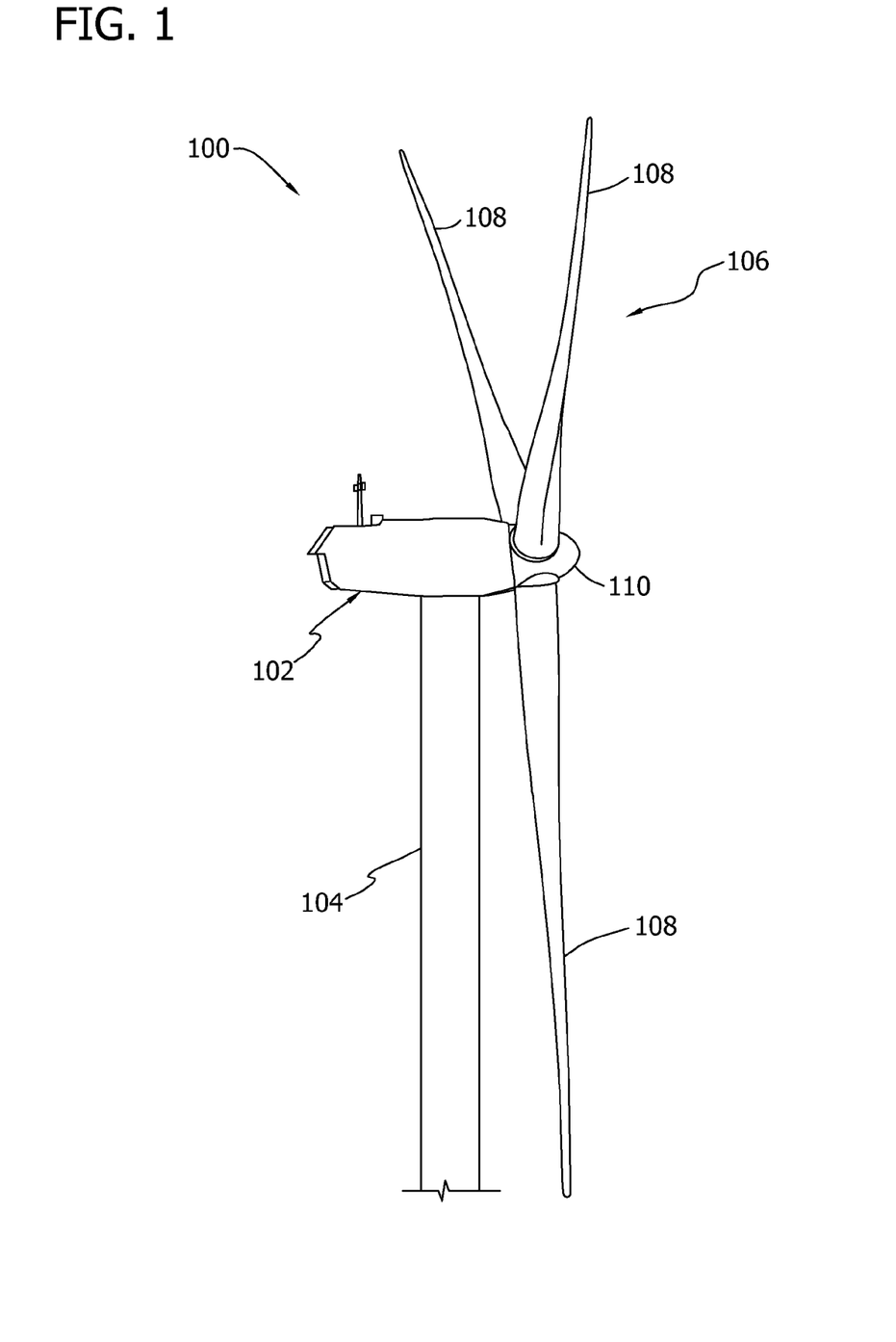
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 160 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
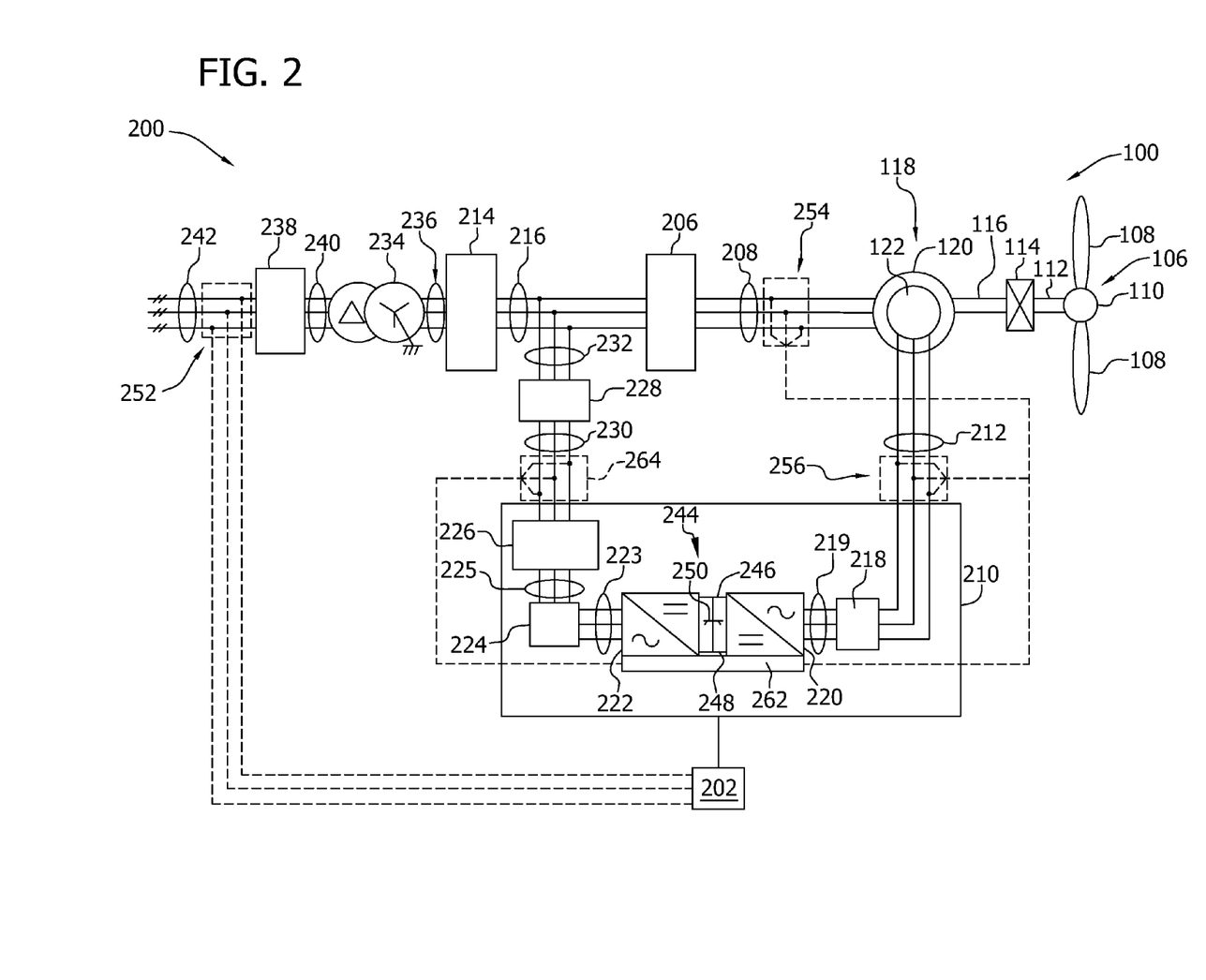
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202 or simply "controller" 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shall 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

FIG. 3 has been discussed in the background part and describes the well-known dependence of the power coefficient from the tip-speed-ratio. As far as the inventors are aware of, basically every text book on wind turbines includes this relationship with the further finding that wind turbines should be operated at $\lambda_{max}$ for maximizing the energy yield.

Figure 4:
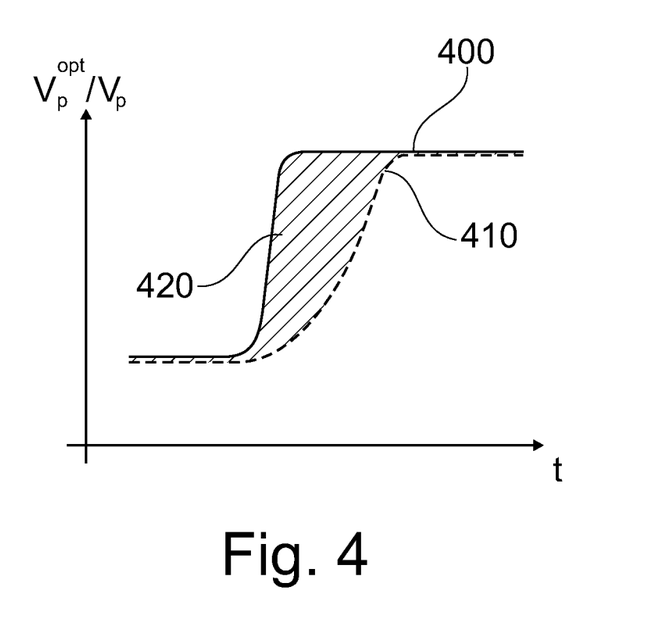
FIGS. 4 and 6 illustrate methods for operating a wind turbine as known in the art.

FIG. 4 shall illustrate the known control of a wind turbine in an exemplary situation wherein a wind gust hits the wind turbine. The diagram shows the optimal rotation speed $v_p^{opt}$ of the rotor blades, which is represented by the line 400, over the time t. As it is evident in this example, the optimal rotation speed 420 increases from a first value to a second value that is higher than the first value. Due to the well-known relation of the optimal tip-speed, which was also explained with respect to FIG. 3, the increase of the optimal rotation speed 420 is caused by a sudden increase in the wind speed, given otherwise constant conditions.

Accordingly, the known control of a wind turbine aims at operating the wind turbine at its optimal rotation speed corresponding to the optimal tip-speed-ratio. This is illustrated by the dashed line 410. When the wind suddenly changes, it is impossible for the real-life turbine to keep track sufficiently fast. Instead, as it is shown in FIG. 4, it takes some time until one or more operation parameters of the wind turbine are re-set and the resetting becomes effective in order to be at the optimal tip speed again (right part of the dashed line 410). The hatched surface 420 shall illustrate the time where the actual rotation speed $v_p$ of the wind turbine deviates from the optimal tip speed $v_p^{opt}$. Consequently, during that time, the turbine produces less energy than it would be possible in theory.

Figure 5:
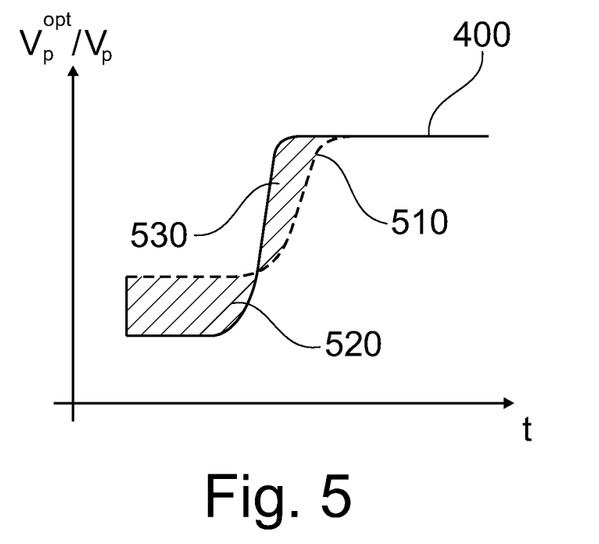
FIGS. 5 and 7 illustrate methods for operating a wind turbine according to embodiments described herein.

FIG. 5 shall illustrate the presently disclosed method for the operation of a wind turbine. The optimal rotation speed $v_p^{opt}$, denoted by line 400, is identical to the optimal rotation speed in FIG. 4. That is, both FIGS. 4 and 5 describe the same environmental situation, namely, there is an identical sudden increase of the wind speed.

According to the presently disclosed method, the controller of the wind turbine seeks to operate the wind turbine off the optimal rotation speed, namely, at an increased rotation speed as compared to the optimal rotation speed. This is illustrated by the dashed line 510 that show, despite the constant wind condition for small times t, that the actual rotation speed $v_p$ is set above the optimal rotation speed in the beginning. For instance, the rotation speed could be set to 10% higher than the optimal rotation speed. Consequently, during that time the power generation is non-optimally as highlighted by the hatched region 520 in the diagram.

Once the gust hits the wind turbine and thereby the wind speed suddenly increases, the optimal rotation speed goes up. The controller seeks to follow this tendency, as shown by dashed line 510, and manages to bring the turbine control to the optimal rotation speed essentially sooner than a known controller as described with respect to FIG. 4. That is, the hatched region 510 representing the time where the controller operates the wind turbine in a non-optimal manner is substantially smaller than the hatched region 420 of FIG. 4.

In this regard it is of high importance to keep in mind that the generated power increases with the cube of the wind speed. This means, paraphrasing, that an increase of the generated power by 1% at a wind speed $v_1$ results in eight times more overall generated power than an increase of the generated power by 1% at half of the wind speed, i.e, at a wind speed $v_1/2$. That is the reason why the reduction of the dashed surface 510, i.e. the reduction of the time where the wind turbine is operated in a non-optimal manner at higher wind speeds (in FIG. 5 illustrated by the hatched region 530 is much more valuable in terms of AEP than the non-optimal time where the wind turbine is operated in a non-optimal manner at lower wind speeds (in FIG. 5 illustrated by the hatched region 520).

As shown in FIG. 5, according to embodiments combinable with other embodiments described herein, the turbine controller sets the actual rotation speed to the optimal rotation speed at higher wind speeds. This is only an embodiment, and dependent on what the actual wind speed is like, it could also be possible that the controller seeks to operate the wind turbine at an increased rotation speed as compared to the optimal rotation speed also at higher wind speeds.

However, according to embodiments described herein, the deviation from the optimal rotation speed depends on the absolute wind speed. For instance, at wind speed very close to the rated wind speed, for instance, maximally 20% below the rated wind speed, it is possible to select a smaller deviation from the optimal rotation speed than at times with smaller wind speeds.

In addition or alternatively, it is possible that the turbulence parameter represents, solely or inter alias, a span width (i.e., a maximal positive and/or negative deviation from the average value, such as the average wind speed) of wind variations around the average value. For instance, wind measurements could indicate that the average value of the wind speed is at 5 m/s with a measured positive maximal deviation of 4 m/s. Hence, the wind speed apparently was never higher than 9 m/s during the time interval of interest. It is also generally possible that the turbulence parameter represents a weighted span width, that is, a statistical occurrence probability is assigned to each deviation. For instance, where the average wind speed is 5 m/s with a maximal deviation of up to 9 m/s, wind speed of between 8 m/s and 9 m/s might have an occurrence probability of below 0.05.

The turbulence parameter is used for the operation of the wind turbine. Hence, for instance, if the shown higher optimal tip speed 400 in FIG. 5 corresponds to a wind speed that has a low occurrence probability, such as below 0.1, not limited to the shown embodiment, the controller could be adapted to set the rotation speed to the optimal rotation speed for wind speeds whose occurrence probability is below a selectable threshold value. That is why in the exemplary embodiment illustrated in FIG. 5 the rotation speed 510 is not above but coinciding with the optimal rotation speed 400 after the increase of the optimal rotation speed 400.

Figure 6:
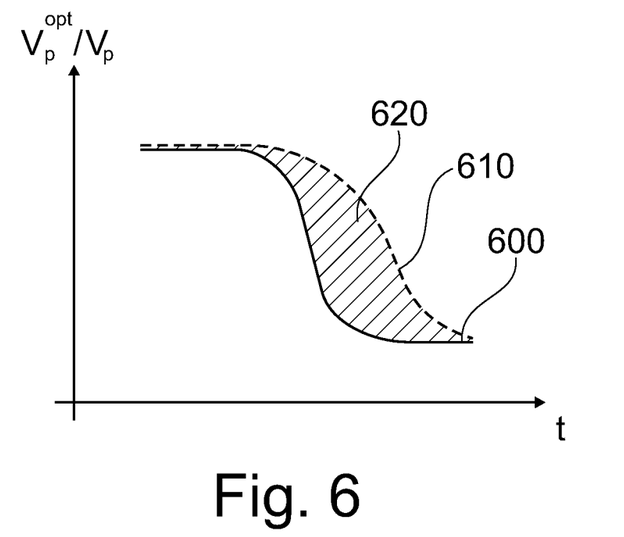
Figure 7:
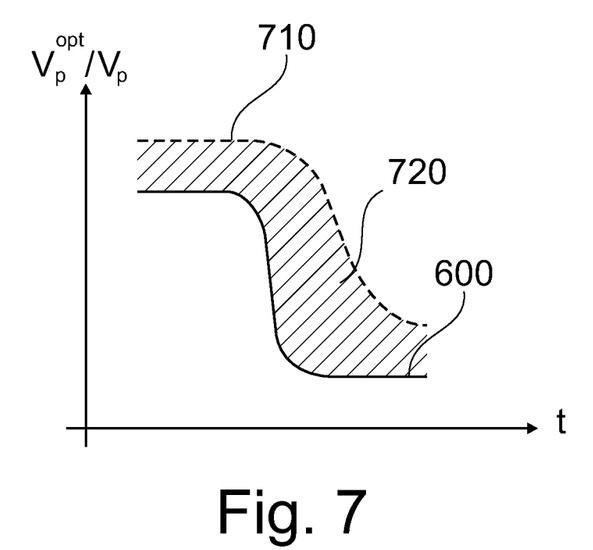

FIGS. 6 and 7 illustrate a situation wherein a lull approaches the wind turbine, and consequently the wind speed suddenly decreases. Thus, as it is shown by the line 600, evident from the general power coefficient curve as illustrated with respect to FIG. 3, the optimal rotation speed $v^p_{opt}$ goes down. FIG. 6 illustrates a method for operating a wind turbine as known in the art, that is, the control of the wind turbine aims at keeping track of the optimal rotation speed. This might work in theory and for constant wind speeds, as can be seen for lower times in FIG. 6, however, when there is a sudden decrease of the wind speed, the wind turbine settings cannot be adjusted sufficiently fast so that there is a time where the actual rotation speed $v_p$ of the wind turbine, denoted by 610 in FIG. 6, differs from the optimal wind speed 600. During this time, the power generation is non-optimal which shall be illustrated by the hatched region 620.

FIG. 7 illustrates the identical environmental situation with the same lull 600 as in the situation of FIG. 6. However, according to presently disclosed embodiments, the wind turbine might be operated at a rotation speed $v_p$, denoted by 710, that is higher than the optimal rotation speed. When the lull arrives, the controller seeks to follow the changed situation and reduces the rotation speed. As can be seen in the illustration of FIG. 7, the hatched surface 720, that shall illustrate the don-optimal operation of the wind turbine, is larger than the dashed surface 620 in FIG. 6.

Hence, the comparison of FIGS. 6 and 7 illustrates that the presently proposed method of operation at the times of a suddenly decreasing wind speed typically results in an energy yield of the wind turbine that is worse than the energy yield in the case that the wind turbine is operated by known methods that seek to follow the optimal rotation speed.

Nevertheless, the increase in energy yield at times of suddenly increasing wind speeds, such as at times of gusts, more than outweighs this negative effect on the AEP. In other words, since power is proportional to the cube of the wind speed, it is more profitable to react to gusts rather than lulls. In reality, the wind has local gusts and lulls frequently. And the controller constantly needs to react to these changes, by causing the rotor to accelerate or to decelerate. Thereby, known methods to operate the turbine do not take site turbulence into account when determining the most profitable tip speed.

For instance, let the wind speed be 10 m/s. Given a today's wind turbine, a gust of 11 m/s will result in a power increase to 1331 kW (33%), and a drop of wind speed to 9 m/s will result in a power decrease to 729 kW (27%). Is the wind turbine operated as described herein, the rotor can accelerate faster to respond to the changed wind speed situation of 11 m/s than a known wind turbine. On the other hand, it takes the rotor longer to decelerate to respond to the reduced wind speed situation of 9 m/s than a known wind turbine. In other words, optimal speed is regained more quickly for gusts than for lulls.

However, due to the fact that the power yield is proportional to the cube of the wind speed, the gain at the higher wind speed of 11 m/s does more than compensate the loss at the lower wind speed of 9 m/s. Consequently, the method as described herein operates the wind turbine at an increased rotor speed as compared to the optimal rotor speed. The described method will particularly work for higher turbulence sites (e.g., wind turbine sites on or close to the mountains or hills) where the positive effects on the AEP are typically more significant than at lower turbulence sites (e.g., wind turbine sites in a flat country-side or off-shore wind turbines).

One of the main benefits of the current disclosure is to gain higher power from the available energy, in particular at winds below the rated operation of the wind turbine. The inventors were able to show by simulations that with this idea, an AEP increase of up to about 0.5% can be obtained, in particular at wind turbine sites being exposed to larger wind turbulences.

An example of the consequences when operating a wind turbine at higher rotation speeds as disclosed herein shall be given in the following. For a 5-8% increase in the averaged rotation speed, one should expect a 1-1.5 dB increase in noise levels. At the same time, the inventors found out that a 0.4-0.6% increase in AEP can be expected. This is particularly true with higher turbulent sites (such as, at A-class sites according to IEC 61400-1). But the increase in energy yield can still be relevant at lower turbulent sites (such as, at B-class sites according to IEC 61400-1).

The disclosed method is typically operated in a closed loop manner. According to the embodiment described, and generally applicable, the turbulence parameter is determined online. In this context, "online"-determination shall be understood as a determination of the turbulence intensity based on actual wind values, normally including historical values of up to maximally 24 hours, typically 12 hours, more typically 6 hours or 1 hour, and even more typically maximally 30 min or 15 min. In particular, according to many embodiments, the actual turbulence intensity is constantly determined, and used for setting the desired rotation speed.

Setting the desired rotation speed can be particularly performed by amending the moment of the generator, such as, by varying the voltage applied to the generator magnets. For instance, in the event that an increase of the rotation speed is desired (such as in the situations as illustrated in FIGS. 4 and 5), the generator moment (i.e., the generator torque) can be reduced by reducing the applied voltage.

The turbulence is represented by a turbulence parameter, which may be a scalar value, such as a standard deviation, or a vector including several turbulence related information, such as an average wind speed value, a standard deviation of the wind speed, information about maxima in the wind speed possibly together with their occurrence probability etc. The turbulence parameter may be determined by measurement. For instance, it is possible to measure the wind speed and/or the wind direction and to calculate the turbulence parameter therefrom. It is also possible that the turbulence parameter is determined indirectly, such as by analyzing values about the variations in the pitch and/or the generator torque. It is generally typical that historical values are used for the determination, in particular, of the recent hour or half an hour.

Based on the varying turbulence situation represented by the turbulence parameter, the tip speed is typically varied dynamically. This is particularly useful to increase the AEP at sites where there is a seasonal variation of the turbulence seasonally or in near shore turbines where in particular the wind direction varies very frequently.

It is possible that the described embodiments for operating a wind turbine are combined with a method for operating a wind turbine at a reduced noise emission (so-called "noise reduced operation", "NRO"), such as, during night. Dependent on the specific situation, the presently described method may be overruled, constantly or only for specific time intervals, by the noise reduced operation during those times where the noise emission has to be limited. However, according to embodiments, the presently described method may be used for the control of the wind turbine whenever the resulting noise production is in harmony with the noise related regulations. It may be checked as part of the method, and/or the wind turbine controller may be programmed to check whether the operation according to embodiments herein is in conflict or in harmony with the noise reduced related regulations. In the event that there is harmony, the wind turbine is operated according to the presently described embodiments. In the event that there is a conflict, the controller might base the operation of the wind turbine on the NRO set points.

The method and apparatus as described herein provide a further beneficial effect with respect to aging of the rotor blades, such as fouling, abrasion, deterioration etc. Generally, despite aging of the rotor blades, which is usually unknown to the controller, the controller commands the same torque to the generator as if the blades were new and would not exhibit a deterioration of the aerodynamic properties. That is, with reference to the curve diagram illustrated in FIG. 3, the controller makes the turbine run slower than desired, that is, somewhat to the left from the maximum in FIG. 3. With embodiments of the present invention, the turbine controller commands, for instance, a lower torque at the generator in order to operate the wind turbine at an increased speed. That is, with respect to the $c_p$-$\lambda$-curve of FIG. 3, the turbine is typically run on the right side of the maximum of the $c_p$-$\lambda$-curve. Although this operating point might be theoretically non-optimal in the case of non-aged rotor blades, with degraded blades the operating point might move towards the operating point which corresponds to the factual optimal operating point of the aged rotor blades.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications. Furthermore, it shall be understood that the described method can be part of a computer program for operating a wind turbine. The computer program is typically run on a PLC type controller. It can typically be stored, for instance in an executable version, on a computer-readable medium, such as a hard drive, a CD or DVD, a data storage stick, or the like.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine before the wind turbine reaches its rated power, the wind turbine including a rotor adapted to rotate at an optimal speed, the method comprising:
    a) determining a turbulence parameter; and,
    b) operating the wind turbine at a speed that is higher than the optimal speed by a speed deviation amount;
    wherein the speed deviation amount is dependent on the turbulence parameter in that the speed deviation amount is increased when the turbulence parameter increases or is decreased when the turbulence parameter decreases.

2. The method according to claim 1, wherein determining the turbulence parameter includes at least one of measuring the wind speed, measuring the wind direction, measuring the generated power, and determining the pitch angle.

3. The method according to claim 1, comprising at least one of increasing or decreasing the generator moment.

4. The method according to claim 1, wherein determining the turbulence parameter includes at least one of calculating an average value and a standard deviation.

5. The method according to claim 4, wherein the average value and the standard deviation are calculated based on measured values.

6. The method according to claim 5, wherein the measured values are measured in a time interval of at least 5 minutes.

7. The method according to claim 1, wherein the speed is one of rotation speed, tip speed, and tip-speed-ratio.

8. The method according to claim 1, wherein the wind turbine is operated at a speed of at least 5% more than the optimal speed.

9. The method according to claim 1, wherein determining the turbulence parameter includes measuring variations in the pitch angle of the at least one rotor blade.

10. The method according to claim 1, wherein determining the turbulence parameter includes measuring variations of the power output of the wind turbine.

11. A method for operating a wind turbine before the wind turbine reaches its rated power, the wind turbine including a rotatable rotor adapted to rotate with an optimal speed, the method comprising:
    a) measuring the turbulence intensity;
    b) setting the speed of the rotor to a speed that is higher than the optimal speed by a speed deviation amount, wherein the speed deviation amount is dependent on the turbulence intensity in that the speed deviation amount is increased when the turbulence parameter increases or is decreased when the turbulence parameter decreases; and
    c) operating the wind turbine at said set speed.

12. The method according to claim 11, wherein the turbulence intensity is represented by one or more of an average wind speed, a span width of the wind speed, a standard deviation of the wind speed, an average wind direction, a span width of the wind direction, a standard deviation of the wind direction.

13. The method according to claim 11, wherein the wind turbine is operated at a speed of at least 5% more than the optimal speed.

14. The method according to claim 11, wherein the speed is set to the optimal speed for wind speeds whose occurrence probability is below a selectable threshold value.

15. A wind turbine operating below its rated power, comprising:
   a) a rotor including at least one rotor blade, the rotor being adapted for rotating at an optimal speed;
   b) a controller for controlling the wind turbine, wherein the controller is configured for:
      i) determining a turbulence parameter; and,
      ii) operating the wind turbine at a speed that is higher than the optimal speed of the rotor by a speed deviation amount;

wherein the speed deviation amount is dependent on the turbulence parameter in that the speed deviation amount is increased when the turbulence parameter increases or is decreased when the turbulence parameter decreases.

16. The wind turbine according to claim 15, further comprising at least one of a wind vane and an anemometer, wherein determining the turbulence parameter includes at least one of measuring the wind speed by means of the anemometer and measuring the wind direction by means of the wind vane.

17. The wind turbine according to claim 15, wherein the wind turbine is adapted to be operated at a speed of at least 5% more than the optimal speed.

18. The wind turbine according to claim 15, the controller is adapted to set the speed to the optimal speed for wind speeds whose occurrence probability is below a selectable threshold value.

* * * * *

UNITED STATES PATENT AND TRADEMARK OFFICE
CERTIFICATE OF CORRECTION

PATENT NO. : 9,587,628 B2
APPLICATION NO. : 13/351690
DATED : March 7, 2017
INVENTOR(S) : Narayana et al.

It is certified that error appears in the above-identified patent and that said Letters Patent is hereby corrected as shown below:

In the Specification

In Column 7, Line 29, delete "a." and insert -- σ. --, therefor.

In the Claims

In Column 18, Line 19, in Claim 1, delete "and," and insert -- and --, therefor.

In Column 18, Line 67, in Claim 12, delete "of an" and insert -- of: an --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*